United States Patent Office 3,222,302
Patented Dec. 7, 1965

3,222,302
METHOD OF FOAMING ORGANO-PLASTIC SYNTHETIC RESINS AND PRODUCTS PRODUCED THEREFROM
Volker Böllert, Krefeld, Gerhard T. Fritz, Krefeld-Bockum, Hermann Schnell, Krefeld-Uerdingen, and Hans Georg Lotter, Krefeld-Bockum, Germany, assignors to Farbenfabriken Bayer Aktiengesellschaft, Leverkusen, Germany, a corporation of Germany
No Drawing. Filed Apr. 17, 1962, Ser. No. 188,271
Claims priority, application Germany, Apr. 19, 1961, F 33,706
8 Claims. (Cl. 260—2.5)

The present invention is concerned with a process for the production of foamed materials.

In the processes for the production of foamed materials, one can distinguish between physical and chemical foaming. Physical foaming uses the possibly very high solubility at high pressures of inert gases in the synthetic resins to be foamed. In the case of high temperatures and reduction of the pressure, the solubility of the gases decreases and the foam formation takes place. Chemical foaming, on the other hand, depends either upon chemical reactions which take place at high temperatures in which blowing agents, such as carbon dioxide, nitrogen and the like, are liberated in the synthetic resin present in a plastic condition, or upon thermal decomposition of incorporated materials with the formation of gases in the synthetic resin.

The last mentioned process has found wide application for the foaming of thermoplastic synthetic resins, such as polyvinyl chloride and polyethylene. The best known additives, such as azo-isobutyric acid dinitrile and benzene sulphohydrazide, develop nitrogen upon heating to their decomposition temperature. It is important that both the blowing agent and the decomposition products which result be compatible with the synthetic resins to be foamed and do not damage them.

This requirement is easier to fulfill in the case of polymers stable against saponification agents, such as polyvinyl chloride or polyethylene, than in the case of polycondensates, such as polyesters. The latter are often decomposed to a great extent when foamed with the aid of the previously known additives and, therefore, frequently yield foamed products with unsatisfactory mechanical properties.

An object of this invention is to provide a novel method for making cellular plastics or, in other words, foamed resins devoid of the foregoing disadvantages. Still another object of the invention is to provide an improved method for foaming a synthetic resin by thermal decomposition of a compound with the formation of a blowing agent. A further object of the invention is to provide improved resinous foams.

The foregoing objects and others are accomplished in accordance with this invention, generally speaking, by providing a particularly advantageous process for the production of foamed resins wherein a compound containing carboxylic acid-carbonic acid ester anhydride groups is incorporated in a synthetic resin and the resin is then heated until decomposition of anhydride groups forms a blowing agent which becomes dispersed in the resin while it is in a plastic state and forms cells or pores in the resin upon solidification thereof.

The carboxylic acid-carbonic acid ester anhydride groups can be incorporated in the resin by mixing a compound containing such a group with the resin, or in some instances, the resin can contain the carboxylic acid-carbonic acid ester groups as part of its chemical structure.

The foaming effect in this process depends on the fact that compounds with a content of carboxylic acid-carbonic acid ester anhydride groups of the general formula

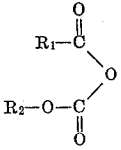

wherein $R_1$ and $R_2$ are lower molecular weight residues and/or parts of a macromolecule, split off carbon dioxide upon heating.

Since the decomposition products of such carboxylic acid-carbonic acid ester anhydrides, in addition to carbon dioxide, are mainly carboxylic acid esters, a good toleration with the synthetic resin to be foamed is guaranteed. Carbonic acid esters of this type are known to be used frequently as plasticizers for the modification of the properties of synthetic resins.

Compounds containing carboxylic acid-carbonic acid ester anhydride groups can be prepared easily by the reaction of the corresponding carboxylic acid salts with halogeno-carbonic acid esters. A particularly advantageous process is one in which a carboxylic acid salt is reacted with a halogenated carbonic acid ester in water at a pH value of from about 5.5 to about 8.5 and possibly in the presence of primary, secondary or tertiary amines or quaternary ammonium bases or their salts as catalysts and inert organic solvents.

The above mentioned general inventive concept has a wide range of applicability. One embodiment contemplated involves mixing a synthetic resin with a lower molecular weight carboxylic acid-carbonic acid ester anhydride below the decomposition temperature of the anhydride and heating the mixture so obtained to the decomposition temperature of the anhydride with the evolution of carbon dioxide which becomes entrapped in the resin to form a foam. In the case of lower molecular weight mixed anhydrides of this type, $R_1$ and $R_2$ in the above given formula are lower molecular radicals, such as alkyl, cycloalkyl, aryl, alkylaryl, or arylalkyl radicals, whereby the aliphatic groups can be linear or branched, saturated or unsaturated and the aliphatic as well as the aromatic residues can be substituted by, for example, halogen atoms, nitro groups, methoxy radicals, ester groups and additional carboxylic acid-carbonic acid anhydride groups. For example, $R_1$ and $R_2$ can be methyl, ethyl, propyl, butyl, isobutyl, hexyl, decyl, dodecyl or the like. Moreover, $R_1$ and $R_2$ can be vinyl, allyl, 1-propenyl 2-butenyl, 2-penten-4-ynyl or the like. Likewise, $R_1$ and $R_2$ can be cyclopropyl, cyclobutyl, cyclohexyl or the like. $R_1$ and $R_2$ may also be aryl such as, phenyl, naphthyl, chlorophenyl, bromophenyl, chloronaphthyl, nitrophenyl, benzyl, styryl or the like. Compounds of this type are, for example, acetic acid-carbonic acid ethyl ester anhydride, propionic acid carbonic acid ethyl ester anhydride, sebacic acid-bis-carbonic acid methyl ester anhydride (melting point 42–43° C.), sebacic acid-bis-carbonic acid phenyl ester anhydride (melting point 60–61° C.), acrylic acid-carbonic acid ethyl ester anhydride (boiling point 67–68° C./8 mm. Hg), methacrylic acid-carbonic acid phenyl ester anhydride (boiling point 68–68.5° C./9 mm. Hg), methacrylic acid-carbonic acid methyl ester anhydride (boiling point 72–73° C./7 mm. Hg), methacrylic acid-carbonic acid butyl ester anhydride (boiling point 101° C./10 mm. Hg), crotonic acid-carbonic acid methyl ester anhydride (boiling point 47–48° C./0.4 mm. Hg), sorbic acid-carbonic acid ethyl ester anhydride (boiling point 82–83° C./0.1 mm. Hg), benzoic acid-carbonic acid methyl ester anhydride (boiling point 77–78° C./0.25 mm. Hg), benzoic acid-carbonic acid ethyl ester anhydride, benzoic acid-carbonic acid phenyl ester anhydride (melting point 63° C.), benzoic acid-carbonic acid-p-tert.-butylphenyl ester-anhydride (melting point 72° C.), butane-1,4-diol-bis-(carbonic acid ester-benzoic acid anhydride) (melting point 77° C.), hexane-1,6-diol-bis-(carbonic acid ester-benzoic acid anhydride) (melting point 58° C.), diethylene glycol-bis-(carbonic acid ester-benzoic acid anhydride) (melting point 54–56° C.), p-nitrobenzoic acid-carbonic acid-ethyl ester anhydride, 3-chlorobenzoic acid-carbonic acid ethyl ester anyhdride (boiling point 119–121° C./2 mm. Hg), isophthalic acid-bis-(carbonic acid-methyl ester anhydride) (melting point 55–56° C.), isopthalic acid-bis-(carbonic acid-ethyl ester anyhdride) (melting point 26–27° C.), isophthalic acid-bis-(carbonic acid-phenyl ester anyhdride) (melting point 95–96° C.), fumaric acid monoethyl ester-carbonic acid ethyl ester anyhdride and terephthalic acid-monomethyl ester-carbonic acid ethyl ester anyhdride, crotonic acid-carbonic acid ethyl ester anyhdride, isovalerianic acid-carbonic acid ethyl ester anyhdride, butadiene(1,3)-di-carboxylic acid(1,4)-methyl ester-carbonic acid ethyl ester anhydride, pentadiene(1,3)-carboxylic acid(1)-carbonic acid ethyl ester anhydride, octatetraene(1,3,5,7)-dicarboxylic acid(1,8)-methyl ester-carbonic acid ethyl ester anhydride, cinnamic acid-carbonic acid ethyl ester anhydride, terephthalic acid monobutyl ester-carbonic acid ethyl ester anhydride, phthalic acid monomethyl ester-carbonic acid ethyl ester anhydride, cyanacetic acid-carbonic acid ethyl ester anhydride, p-nitrophenyl acetic acid-carbonic acid isopropyl ester anhydride, p-nitrophenyl acetic acid-carbonic acid ethyl ester anhydride, phenyl-acetic acid-carbonic acid ethyl ester anhydride, p-nitrophenyl acetic acid-carbonic acid phenyl ester anhydride, pivalinic acid-carbonic acid ethyl ester anhydride, benzoic acid-carbonic acid isopropyl ester anhydride, di-phenyl acetic acid-carbonic acid ethyl ester anhydride, diphenyl acetic acid-carbonic acid isopropyl ester anhydride, diphenyl acetic acid-carbonic acid phenyl ester anhydride and 1-naphthoic acid-carbonic acid ethyl ester anhydride.

Use of compounds of the foregoing type for the production of foamed materials is advantageous not only because such compounds are readily available and cheap, but also because the temperature at which decomposition and thus the commencing of the splitting off of the carbon dioxide occurs can be varied by selection of a particular compound of this type. The compound to be used can be selected so that decomposition occurs at or above the softening temperature of the synthetic resin. For example, the decomposition of propionic acid-carbonic acid ethyl ester anhydride begins at 90° C., whereas benzoic acid-carbonic acid methyl ester anhydride first noticeable decomposes at about 130° C. and benzoic acid-carbonic acid ethyl ester anhydride only at about 150° C. Furthermore, it is possible, in most cases, to lower the decomposition temperatures of the carboxylic acid-carbonic acid anhydride by small additions of, for example, tertiary amines or acidic or basic reacting salts, including sodium and potassium-methylate, -acetate, -propionate, -sebacate, -stearate, -benzoate, -carbonate, -dicarbonate, -phosphate (primary, secondary and tertiary), -cyanide, lithium carbonate, aluminum sulphate, stannous sulphate, ammonium chloride, tin tetrachloride, beryllium chloride and N,N-dimethyl aniline hydrochloride.

In a further form of the new process, one of the residues $R_1$ or $R_2$ in the above formula again signifies a low molecular weight radical, such as alkyl, cycloalkyl, aryl or alkylaryl radical, whereby the aliphatic group can be linear or branched, saturated or unsaturated and the aliphatic and the aromatic residues can be substituted by further groups, such as halogen atoms, nitro groups, methoxy radicals or ester groups, whilst the other radical is a residue of a macromolecule. Suitable low molecular weight radicals are listed above. The macromolecule which is either $R_1$ or $R_2$ in the chemical radical of the resin. In this case, the carboxylic acid-carbonic acid ester anhydride groups are chemically bound to the main groups of the polymeric molecule as side chains and/or end groups.

The production of these compounds in which the carboxylic acid-carbonic acid ester anhydride group is part of the resin chain, which are also capable of forming foamed material, can take place from polymers bearing hydroxyl or carboxyl groups in a maner analogous to the production of low molecular weight carboxylic acid-carbonic acid ester anhydrides according to the above-mentioned process under such conditions that damage to or decomposition of the previously-mentioned polymers is avoided.

As starting materials for the production of such polymers having anhydride groups as are to be used according to the invention there may be mentioned by way of example, polyvinyl alcohol and derivatives of polyvinyl alcohol which still contain free hydroxyl groups, polyacrylic acids and derivatives of polycarylic acids which still contain, at least partly, free carboxylic acid groups, cellulose and partly acylated or alkylated cellulose, polymeric esters with free hydroxyl and/or carboxyl groups, polyethers with free hydroxyl- and/or carboxyl-groups, such as polyethers from dihydroxy compounds and epichlorohydrin, as well as mixed condensates and mixed polymers which still contain free hydroxyl and/or carboxyl groups. In so far as hydroxy compounds are concerned, these are to be converted into the corresponding chlorocarbonic acid esters and these reacted with a carboxylic acid salt to form the macromolecule.

Furthermore, polymers which contain carboxylic acid-carbonic acid ester anhydride groups as side chains can also be obtained from such low molecular weight carboxylic acid-carbonic acid ester anhydrides, which contain polymerizable groups, whereby the polymerization of the monomeric compounds has to take place below the decomposition temperature of the carboxylic acid-carbonic acid ester anhydride groups. For example, methacrylic acid-carbonic acid ethyl ester anhydride alone or with other unsaturated compounds capable of mixed polymerization can be polymerized to give high molecular weight products which, by subsequent heating to temperatures above the decomposition point of the carboxylic acid-carbonic acid ester anhydride side chains can be foamed according to the invention.

The particular advantage of this foam of the process, in contradistinction to the previous process for the production of foamed materials, lies the possibility of homogeneously distributing in the synthetic resin molecule the groups which provide carbon dioxide as blowing agent. Hereby, there is achieved, on foaming an extraordinarily uniform gas formation in all parts of the synthetic resin and particularly homogeneous structure is thereby obtained.

In yet a further form of the process according to the invention not only $R_1$, but also $R_2$ signify parts of a macromolecule, i.e., the carboxylic acid-carbonic acid ester anhydride groups are incorporated in the main chain of the polymer molecule.

Thus, for example, there can be used polymeric carboxylic acid-carbonic acid ester anhydrides which are produced from dicarboxylic acids and bis-chlorcarbonic acid esters of dihydroxy compounds. Such dicarboxylic acids are, for example adipic acid, sebacic acid, isophthalic acid and terephthalic acid. Examples of bis-chlorocarbonic acid esters are the bis-chlorocarbonic acid esters of butane-1,4-diol, hexane-1,6-diol, $\beta,\beta'$-dihydroxydiethylethers and 4,4'-dihydroxydiphenylalkanes and -silphones such as 4,4'-dihydroxydiphenylmethane, 4,4'-dihydroxydiphenylethane, and -propane(2,2), 4,4'-dihydroxydiphenylsulfone and -sulphide and the like.

Furthermore, these products can also contain in the main chain carboxylic acid ester and/or carbonic acid ester residues, such as in the case of compounds which are obtained by the reaction of a bis-phenol-bis-chlorocarbonic acid ester, of a bis-phenol and of a dicarboxylic acid or of a bis-phenol-bis-chlorocarbonic acid ester, of a dicarboxylic acid dichloride, of a bis-phenol and of a dicarboxylic acid.

Furthermore, low molecular weight starting materials which contain ester anhydrid groups and reactive end groups can be converted in a second reaction stage, by reaction of the end groups, into polymeric compounds; for example, a high molecular weight synthetic resin of the type mentioned can be produced from a product obtained from hexane-1,6-diol-bis-chlorocarbonic acid ester, isophthalic acid and excess hexanediol, which product contains hydroxyl end groups, by reaction with a diisocyanate.

In the case of foaming of products of this type, it was found, surprisingly, that in spite of the splitting off of carbon dioxide, they pass over into the foamed material without decomposition.

Here, too, the distribution of the groups providing the carbon dioxide is already provided in the synthetic resin molecule and foamed materials with an extraordinarily highly uniform pore structure are obtained.

Yet another foam of the new process consists in foaming mixtures of plasticizable synthetic resins with polymers which contain carboxylic acid-carbonic acid ester anhydride groups chemically bound in the side chain or in the main chain. Low molecular weight carboxylic acid-carbonic acid ester anhydrides can, if desired, also additionally be added to such mixtures.

As a further example of a form of carrying out the present invention, there is to be mentioned the foaming of macromolecular, linear polycarboxylic acid-carbonic acid ester anhydrides, which are produced from unsaturated dicarboxylic acids and bischlorocarbonic acid esters of organic dihydroxy compounds or macromolecular, linear mixed condensates, which, apart from carboxylic acid-carbonic acid ester anhydride groups, also contain in the chain ester and/or carbonate groups and polymerizable double bonds. Such linear polycondensates containing unsaturated dicarboxylic acid residues or their mixtures with polymerizable monomers can, if necessary with addition of polymerization catalysts, be foamed by heating, with simultaneous cross-linking by polymerizing or mixed polymerizing. Thus, for example, the bis-chlorocarbonic acid ester of Bis-phenol A or a low molecular weight linear polycarbonate from Bis-phenol A with chlorocarbonic acid ester end groups can be reacted with fumaric acid or a low molecular weight polyester of fumaric acid with a glycol or an aromatic dihydroxy compound, for example, again Bis-phenol A with carboxyl end groups to give a macromolecular, linear product with, on the one hand, fumaric acid residues and, on the other hand, with carboxylic acid-carbonic acid ester anhydride groups. A reaction product of this type or mixtures thereof with a monomeric vinyl compound, possibly one of these which also possesses a carboxylic acid-carbonic acid ester anhydride group, as is described above, can be foamed by heating with the addition of, for example, a peroxide. By suitable addition of the catalyst, polymerization or mixed polymerization take place at the same time at the foaming temperature so that a cross-linked and thus non-melting and insoluble foam material is obtained.

The invention is further illustrated but not limited by the following examples in which parts are by weight unless otherwise specified.

*Example 1*

A mixture of about 17.5 grams styrene and about 2.5 grams benzoic acid-carbonic acid methyl ester anhydride (boiling point 77–78° C./0.25 mm. Hg) is polymerized at 90° C. by means of about 40 mg. methyl ethyl ketone hydroperoxide and about 100 mg. benzoyl peroxide. The polymerization commences after about 40 minutes. After 15 hours, a glass-clear hard polymer is obtained (relative viscosity 1.506 in 0.5% mthylene chloride solution).

The product is foamed in the following manner: About 2.0 grams of the product chopped up into granules are pressed together in a thick-walled reaction glass with an internal diameter of 160 mm., the inner wall of which is coated with a trace of silicon oil, provided with a ground-fitted plunger made from non-rusting steel. The reaction glass is then heated in a bath to about 110° C. The polymeric granules melt together. The melting is favored by the pressure of the plunger.

After the polymer has melted homogeneously, it is heated to 160° C. Foam formation thereby occurs against the weight of the metal plunger and is ended after 30–40 minutes. After cooling, a solid foam body with uniform pore division is obtained. Relative viscosity: 1.498 in 0.5% methylene chloride solution.

The foam body can be worked up mechanically, for example, sawed and nailed, without cracks occurring.

*Example 2*

A mixture of about 5.0 grams methacrylic acid-carbonic acid ethyl ester anhydride (boiling point 72–73° C./8 mm. Hg) and about 35.0 grams styrene are mixed polymerized at 80° C. by means of 80 mg. methyl ethyl ketone hydroperoxide and 200 mg. benzoyl peroxide. The polymerization commences after 30–45 minutes. After 15 hours, a mixed polymer is obtained with a relative viscosity of 1.603 (0.5% in methylene chloride). The product shows good stability properties and can be worked up mechanically.

About 20.0 grams of the granulated mixed polymer are heated in an autoclave in an atmosphere of carbon dioxide at a pressure of 10 atmospheres, for 3 hours at 210–220° C. The pressure adjusts itself to 16–17 atmospheres. Upon cooling to room temperature, the pressure drops again to 10–11 atmospheres. The mixed polymer is melted together to a block. It is again chopped up.

About 2.0 grams of the granulate are heated to 130° C., as described in Example 1. A homogeneous foamed body is formed with very uniform pore division. The product is no longer soluble in methylene chloride. Upon coating with organic solvents, such as methylene chloride, benzene and ligroin, it only swells very slightly. It can be mechanically worked up, for example, sawed or nailed, without crack formation. Specific gravity: 0.16 gram/ccm.

*Example 3*

About 1.0 gram isophthalic acid-bis-carbonic acid methyl ester anhydride (melting point 56–57° C.) is dissolved in methylene chloride with about 9.0 grams of a polycarbonate from Bis-phenol A with a relative viscosity of 1.294 (dissolved in 0.5% methylene chloride) prepared in accordance with the process of U.S. Patent 3,028,365. A film is poured from this solution which, after drying at 90–100° C. in vacuum, has a relative viscosity of 1.238 (0.5% in methylene chloride). About 2.0 grams of film chips are foamed in the manner described in Example 2. The foaming temperature is 140–150° C. A hard, tough foamed material results, which can be sawed and nailed. Relative viscosity 1.241 (in 0.5% methylene chloride solution). Specific gravity: 0.21 gram/ccm.

*Example 4*

Chips of a film produced from 1 part by weight of the polymeric mixed anhydride from isophthalic acid and 2,2 - (4,4' - dihydroxydiphenyl) - propane - bis - carbonic acid and 3 parts by weight of a polycarbonate from Bis-phenol A prepared by the process of U.S. Patent 3,028,365, which film has a relative viscosity of 1.247 in 0.5% methylene chloride solution, are foamed in the manner described in Example 2. The foaming temperature is about 180° C.

The foam is exceptionally tough and solid. It can be sawed and nailed without crack formation occurring. Relative viscosity 1.253 (dissolved in 0.5% methylene chloride). Specific gravity 0.26 gram/ccm.

*Example 5*

In the course of 30 minutes at 15–20° C. about 59.4 grams (0.6 mol) phosgene are passed in a vigorously stirred mixture of about 400 ml. methylene chloride and about 700 ml. of an aqueous solution which contains 68.4 grams (0.3 mol) Bis-phenol A and 56.0 grams (1.4 mol) sodium hydroxide, as well as 0.5 gram p-tertiary-butylphenol. It is necessary to cool the reaction mixture in order to maintain the given temperature. The alkaline-reacting reaction mixture is subsequently mixed with 16.6 grams (0.1 mol) isophthalic acid. The pH value of the aqueous phase is adjusted to 7.0–8.0. Under certain conditions, it is necessary to adjust this pH range by the addition of a little acid or alkali or of acid or alkaline reacting salts. After the addition of 0.4 ml. N,N-dimethylcyclohexylamine, the reaction mixture is well stirred at a temperature of 18–22° C. The course of the reaction is followed by determination of the isophthalic acid and chloride ion content in the aqueous phase. After 2 hours, only traces of isophthalic acid can still be detected in the aqueous phase. After the addition of sodium hydroxide solution, the aqueous phase is strongly alkaline (pH 13–14), and is stirred for ½ hour at 20° C. The viscous solution of the polymers formed in methylene chloride is washed neutral with water in a kneader. The methylene chloride is then slowly removed by blowing over of nitrogen. Finally, a crumbly mass remains in the kneader, which is dried in a vacuum drying chest at 60–80° C. The yield of mixed polyester, which contains carbonic acid ester-anhydride groups, is 65.0 to 70.0 grams. Relative viscosity 1.280–1.310. Isophthalic acid content 16.0%.

The product can be worked up from the melt or from solutions to tough, elastic formed bodies and stretchable films and fibers.

The foaming of the mixed polyester takes place in the following two ways:

(a) About 2.0 grams of the product are foamed at 205–215° C. under the conditions given in Example 2. An extraordinarily tough and hard foam is formed which can be worked up mechanically, for example, sawed and nailed, without crack formation occurring. Relative viscosity 1.295 in 0.5% solution in methylene chloride, specific gravity 0.29 gram/ccm.

(b) Upon extrusion of the mixed polyester, a foamed material is obtained with almost the same properties. Relative viscosity 1.297 in 0.5% solution in methylene chloride. Specific gravity 0.34 gram/cm.³

*Example 6*

Chips of a film of relative viscosity 1.243 in 0.5% methylene chloride solution produced from 1 part by weight of the polymeric mixed anhydride from sebacic acid and 2,2-(4,4'-dihydroxydiphenyl)-propane-bis-carbonic-acid and 3 parts by weight of a Bis-phenol A polycarbonate (prepared by the process of U.S. Patent 3,028,365) are foamed in the manner described in Example 2. The foaming temperature is 160–180° C.

The foam body is tough and solid. It can be mechanically worked up, for example, can be sawed or nailed, without crack formation occurring. Relative viscosity 1.247 in 0.5% methylene chloride solution. Specific gravity 0.23 gram/ccm.

It is to be understood that the invention is applicable to the foaming of various synthetic resins including, for example, polyethylene, polystyrene, polyvinyl chlorides, polyvinyl esters and ethers, polymethacrylates, polyamides, polyurethanes, polyesters, especially polycarbonates, epoxy resins, polyoxymethylenes, cellulose esters and ethers, and the like. The polycarbonate plastic can be prepared by any suitable process including the processes disclosed in U.S. Patent 3,028,365 and Canadian Patents 575,585, 578,795, 594,805 and 611,970, such as by reaction of a bis-phenol or the like and phosgene.

The product produced in accordance with the process of this invention can be used for various purposes, such as, for paneling in building structures, insulation, stuffings, wrappings or the like.

Although the invention has been described in considerable detail for the purpose of illustration, it is to be understood that variations can be made by those skilled in the art without departing from the spirit of the invention and scope of the claims.

What is claimed is:

1. A method for making cellular plastics which comprises heating a gas retentive organo-plastic synthetic resin having chemically combined therein at least one

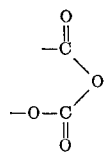

group, until the said groups decompose and split off carbon dioxide which becomes entrapped in the resin and forms cells therein.

2. A method for foaming a polycarbonate resin which comprises mixing the polycarbonate with a compound having at least one carboxylic acid-carbonic acid ester anhydride group and heating the mixture until the anhydride decomposes and splits off carbon dioxide while the mixture is plasticized, whereby the carbon dioxide becomes dispersed in the polycarbonate and upon solidification of the polycarbonate results in a cellular structure.

3. A method for making a polystyrene foam which comprises heating polystyrene and a compound having carboxylic acid-carbonic acid ester anhydride groups until decomposition of the latter with carbon dioxide split off, whereby the carbon dioxide becomes dispersed and entrapped in the polystyrene and forms a foam.

4. A method for making cellular plastics which comprises heating a gas retentive organo-plastic synthetic resin in admixture with a compound having at least one carboxylic acid-carbonic acid ester anhydride group, until the said group decomposes and splits off carbon dioxide which becomes entrapped in the resin and forms cells therein.

5. A method for forming a cellular synthetic resin which comprises heating a gas retentive organo-plastic synthetic resin having at least one

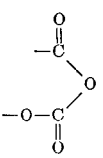

group chemically combined therein, until the resin is molten and the

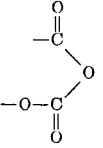

group decomposes to form carbon dioxide which becomes dispersed in the molten resin.

6. A method for forming a cellular synthetic resin which comprises heating a gas retentive organo-plastic synthetic resin while it is in admixture with a compound having at least one carboxylic acid-carbonic acid ester anhydride group, until the resin is molten and the anhydride decomposes to form carbon dioxide which becomes decomposed in the molten resin.

7. The process of claim 5 wherein the synthetic resin is a polycarbonate plastic prepared from 2,2-bis-(4-hydroxy phenyl) propane.

8. The process of claim 6 wherein the synthetic resin is a polycarbonate plastic prepared from 2,2-bis-(4-hydroxy phenyl propane.

References Cited by the Examiner

UNITED STATES PATENTS

| | | | |
|---|---|---|---|
| 2,386,995 | 10/1945 | Wigal | 260—2.5 |
| 2,963,510 | 12/1960 | Scott | 260—2.5 |

FOREIGN PATENTS

| | | |
|---|---|---|
| 117,267 | 1/1901 | Germany. |
| 652,770 | 5/1951 | Great Britain. |
| 838,824 | 6/1960 | Great Britain. |

MURRAY TILLMAN, *Primary Examiner.*

LEON J. BERCOVITZ, *Examiner.*